Jan. 2, 1968          J. V. McKIM          3,361,224

POWER DRIVEN CART FOR FARMERS AND THE LIKE

Filed July 30, 1965

INVENTOR
John V. McKim.

3,361,224
POWER DRIVEN CART FOR FARMERS
AND THE LIKE
John V. McKim, 1509 W. 38th St.,
Anderson, Ind. 46013
Filed July 30, 1965, Ser. No. 476,050
3 Claims. (Cl. 180—65)

ABSTRACT OF THE DISCLOSURE

This cart permits one to lie in a prone position while performing tasks which are usually done in a stooping position. It includes a supporting body mounted on four wheels, a flat surface to support a person in a prone position and means for driving the cart which means may comprise a hand wheel secured to the front axle or an electric drive controlled by a conveniently placed switch.

---

This invention relates to carts, and more particularly, to a cart to be used by farmers and the like.

One of the most tiring of all jobs on a farm is that of leaning over or stooping, as to pick berries and the like, or tomatoes and the like, or to pull weeds and other similar back breaking tasks.

It is, therefore, the principal object of this invention to provide a power-driven cart on which one can lie in a prone position, close to the ground, and be able to pick any kind of berry or other plant, or to do similar work from this position.

Another object of this invention is to provide a power-driven cart that can be moved a short distance at a time merely by the use of a finger tip control.

Another object of this invention is to provide a power-driven cart that is activated by an electric motor operating from a chargeable battery, or in an optional form, by an internal combustion engine geared to the wheels.

Another object of this invention is to provide a power-driven cart that is especially adaptable to use on the farm and the like, by reason of its being both light in weight and compact in size.

Another object of this invention is to provide a power-driven cart of the character herein described that has few moving parts and that can be serviced by anyone having any knowledge of mechanical devices.

Still another object of this invention is to provide a power-driven cart that can be operated by anyone without previous experience with motor activated vehicles.

Figure 1:
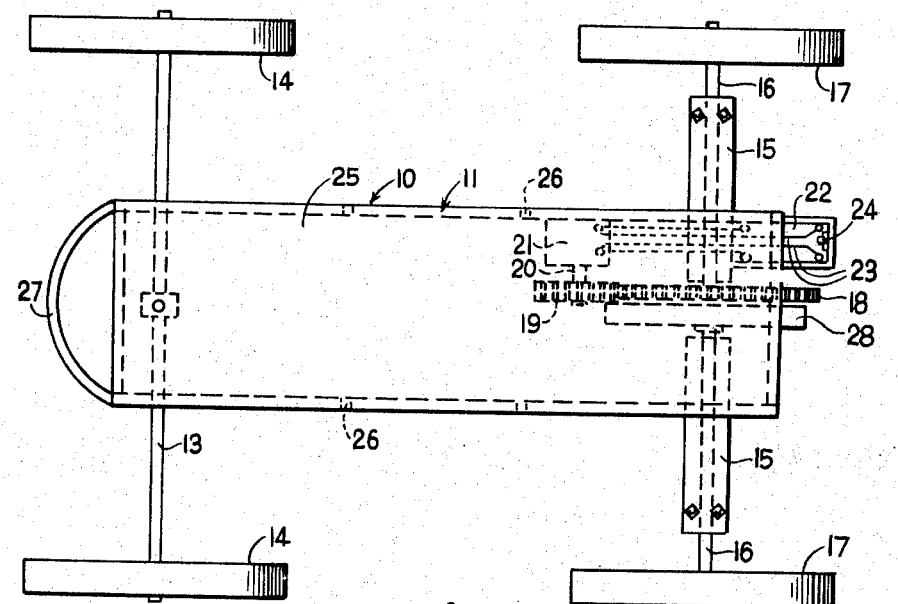
Figure 2:
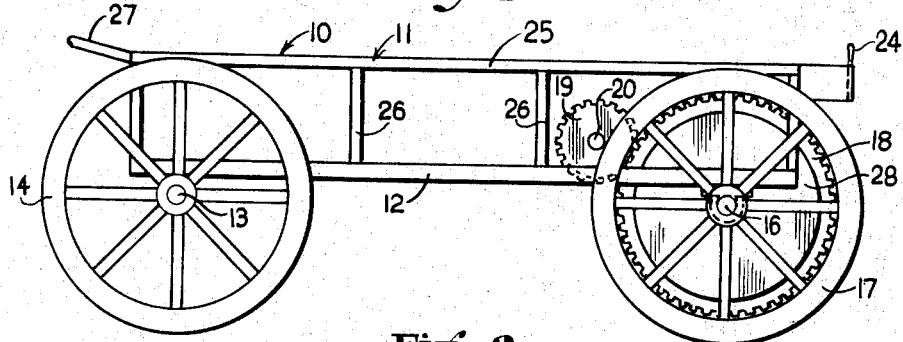
Figures 3, 4:
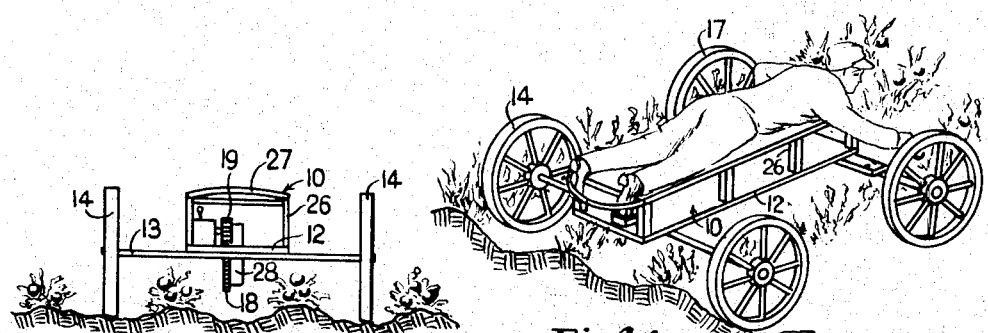

These together with other objects and advantages which will become subsequently apparent reside in the details of construction and operation as more fully hereinafter described and claimed, reference being had to the accompanying drawing forming a part thereof, wherein like numerals refer to like parts throughout and in which:

FIGURE 1 is a top view of this invention.
FIGURE 2 is a side view of this invention.
FIGURE 3 is a rear end view of this invention.
FIGURE 4 is a pictorial view of this invention, in actual use on a farm, and showing a farmer picking tomatoes or the like.

In the accompanying drawing, there is illustrated a power-driven cart 10, embodying a rectangular body 11 having a baseboard 12 supported at the rear by the axle 13, on each end of which is rotatably mounted the wheel 14. The front of the aforesaid baseboard 12 is supported by a two-piece axle support, each of which is indicated in FIGURE 1 of the drawing by the reference numeral 15, since the two axle supports are identical in configuration and both support the front axle 16 on each end of which is rotatably mounted the front wheel 17.

A large gear wheel 18 is suitably secured to the aforesaid front axle 16. The gear wheel projects upward through a recess in the aforesaid baseboard 12 in order to mesh with the drive gear 19 that is secured to the outer end of the shaft 20 of the electric motor 21. This electric motor 21 is mounted on top of the aforesaid baseboard 12. The aforesaid electric motor 21 is activated by the electric battery 22 to which it is connected by the electric wires 23 and the electric switch 24 which is so mounted on the cart as to be within easy reach of its operator when the operator is lying in a prone position on the cart.

Returning to the body 11 of this invention, it will be seen from examination of the accompanying drawing that the body also consists of a horizontally disposed supporting member 25 that is held above and secured to the aforesaid baseboard 12 by a plurality of vertical posts 26. A slightly raised and curved foot support member 27 is secured to the rear end of the aforesaid horizontally disposed supporting member 25 which may or may not be padded on the upper surface thereof according to the desires of the builder of this invention. A handwheel 28 is so mounted on the front axle 16 as to permit the operator of this invention to propel the cart manually when lying down on top of the same merely by pushing downward on the rim of the aforesaid handwheel 28.

Although the just described power-driven cart for farmers and the like is moved by electricity, the invention can just as well be operated by a small internal combustion engine although none is shown in any of the views of the accompanying drawing. The gear drive mechanism can also be replaced by a belt or chain drive mechanism, or a combination of any two or three drives can be used. Since this cart will normally run in a straight line between two rows of plants or the like, no steering mechanism is provided for the same, however, the two back wheels 14 can easily be connected to pedals or levers for steering, if it is thought necessary to do so.

It is not my intention to limit the invention to the precise details of construction shown in the accompanying drawing, it being apparent that such may be varied without departing from the spirit and scope of the invention.

Having described the invention, what I claim as new and desire to have protected by Letters Patent is:

1. A power driven cart for farmers and the like of the character described, comprising a rectangular body embodying a baseboard and a supporting member mounted above the said baseboard and secured to the said baseboard by a plurality of vertically disposed posts, and the said body being mounted on four wheels; and an electric motor mounted on the said baseboard of the said body and activated by an electric battery that is mounted on the front end of the said body, an electric switch and conductors connecting said battery to said motor and switch; and the said electric motor being adapted to drive the front wheels of the said cart through a plurality of gears, thereby setting the said cart in motion when a person, lying in a prone position on the said supporting member of the said body, operates the electric switch.

2. A power driven cart for farmers and the like of the character described, comprising a rectangular body embodying a baseboard and a supporting member mounted above the said baseboard and secured to the said baseboard by a plurality of vertically disposed posts, and the said body being mounted on four wheels; and an electric motor mounted on the said baseboard of the said body and activated by an electric battery that is mounted on the front end of the said body, an electric switch and conductors connecting said battery to said motor and switch; and the said electric motor being adapted to drive the front wheels of the said cart through a plurality of gears, thereby setting the said cart in motion when a person, lying in a prone position on the said supporting member of the said body, operates the electric switch and a handwheel that is mounted on the axle of the two front wheels, thereby providing a means of manually moving the said cart when the person riding on the said cart pushes downward on the rim of the said handwheel.

3. A power driven cart for farmers and the like, comprising a rectangular body having a baseboard and a rectangular body supporting member mounted above and parallel to the said baseboard to which it is secured by a plurality of vertically disposed posts; and an axle secured to the underside and rear end of the said baseboard, the said axle having a free-turning wheel mounted on each outer end thereof; and an axle secured to the underside and front end of the said baseboard; and a manually rotated handwheel mounted on the last mentioned axle, on which is also mounted a large gear wheel that is in mesh with a drive gear which is mounted on the drive shaft of an electric motor which in turn is mounted on the upper side of the said baseboard; and an electric battery being secured to the front end of the said baseboard; and an electric switch being located on the front end of the said cart, the said electric switch being connected to both the said electric motor and to the said electric battery by electric wires, thereby providing the person lying on top of the said supporting member of the said cart with a means of activating the said electric motor and thereby placing the said cart in motion.

References Cited

UNITED STATES PATENTS

| | | | |
|---|---|---|---|
| 1,631,561 | 6/1927 | Symmes | 280—32.5 |
| 2,317,606 | 4/1943 | Harris | 280—32.5 |
| 3,033,303 | 5/1962 | Weekly | 180—65 |
| 3,037,570 | 6/1962 | Olson | 180—6.5 |

FOREIGN PATENTS 668,899  12/1938  Germany.

LEO FRIAGLIA, *Primary Examiner.*

MILTON L. SMITH, *Assistant Examiner.*